R. DUNWODY.
METHOD OF AND APPARATUS FOR DISTILLING CRUDE RESINS.
APPLICATION FILED MAR. 12, 1918.
1,317,781.
Patented Oct. 7, 1919.
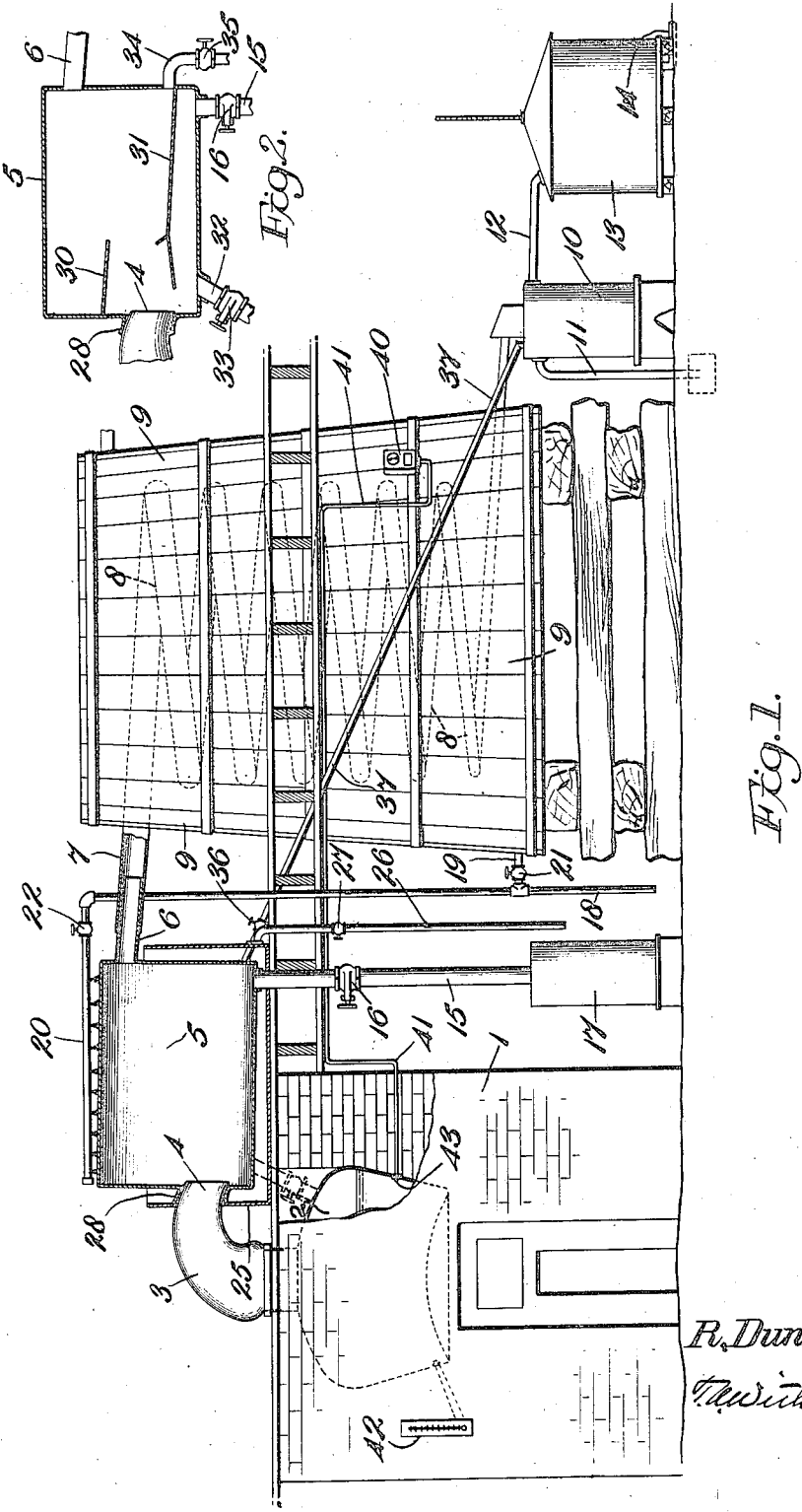
Inventor
R. Dunwody, by
Attorney

UNITED STATES PATENT OFFICE.

ROBSON DUNWODY, OF NEW ORLEANS, LOUISIANA.

METHOD OF AND APPARATUS FOR DISTILLING CRUDE RESINS.

1,317,781.     Specification of Letters Patent.    Patented Oct. 7, 1919.

Application filed March 12, 1918. Serial No. 221,957.

*To all whom it may concern:*

Be it known that I, ROBSON DUNWODY, a citizen of the United States, residing at New Orleans, in the parish of Orleans and State of Louisiana, have invented certain new and useful Improvements in Methods of and Apparatus for Distilling Crude Resins; and I do hereby declare the following to be a full, clear, and exact description of the invention, such as will enable others skilled in the art to which it appertains to make and use the same.

This invention relates to the recovery of turpentine and rosin from crude resins and has for its object to provide a method and apparatus which will be more efficient in use than those heretofore proposed.

With this and other objects in view the invention consists in the novel steps and combinations of steps constituting the method; and in the parts and combination of parts constituting the apparatus, all as will be more fully hereinafter disclosed and particularly pointed out in the claims.

Referring to the accompanying drawings forming a part of this specification in which like numerals designate like parts in all the views:—

Figure 1 is a diagrammatic partially sectional view of an apparatus made in accordance with this invention; and—

Fig. 2 is a sectional view of a somewhat modified form of expansion chamber.

1 indicates any suitable furnace preferably of brickwork as shown, 2 the still proper, provided with the tapered curved goose-neck 3 having its outer downwardly extending end 4 entering the preliminary condenser or chamber 5. And said chamber 5 is provided with the exit 6 making a slip joint with the inlet 7 of the coils 8 of a condenser 9, delivering into the automatic separator 10, provided with the low wine outlet 11, and the turpentine outlet 12, leading into the measuring tank 13, provided with the turpentine outlet 14.

Leading from the pre-condenser or chamber 5 is the drain 15 leading to the tank 17, and having the cock 16. 18 represents a water supply having a branch 19 leading to the condenser 9, and another branch 20 adapted to spray water over said pre-condenser 5 as shown, while 21 and 22 are cocks respectively controlling said branches 19 and 20 as will be clear from the drawings.

25 represents a jacket or receptacle partially surrounding said chamber 5, adapted to receive the cooling water from the sprinkler 20, and 26 represents a drain from said jacket 25 controlled by the cock 27. 28 represents a tapered connection between said chambers 5 and 25 adapted to form a slip joint with the end 4 of the goose-neck 3 as indicated.

In the somewhat modified form of the invention shown in Fig. 2, the chamber 5 is provided with the upper baffle member 30, the lower baffle member 31, the connection 32 having the valve 33, and the connection 34 having the valve 35 all for a purpose that will presently appear.

In operation the crude gum or resin is placed in the still or kettle 2, heat is applied and the turpentine distilled off, in the form of vapors, passes into the water cooled chamber 5 where they are subjected to a cooling action, and at the same time suffer a loss of pressure.

So great is this loss of pressure at times that it may be said, a suction exists between said chamber 5 and the kettle 2, although this suction may not be present at all times. The effect of thus delivering the vapors into the water cooled chamber 5 before passing them on to the condenser coils 9 is found in practice to result in greatly increasing the amount of turpentine that can be recovered from a given quantity of crude resins without impairing the quality of the resin. That is to say, as is well known, if one is to recover high grade rosins from crude gums, he must be careful not to overheat the gums at any stage while in the kettle 2.

I am unable to give an exact scientific explanation for this remarkable result, for the crude resins from which the turpentine is distilled are very complex both as regards their chemical and physical characters, and this complexity varies with the character of the gum itself.

That is, gum gathered the first year after the tree is cut, differs from that gathered the second year, and so on. But, I believe a plausible explanation may be found in the fact that the vapors are not only cooled but expand in the said chamber 5, and that therefore the lowering of the pressure in the kettle 2 is quite pronounced with a consequent lowering of the boiling points of the gum.

This free exit of vapors from the kettle also prevents the probable pocketing and partial condensation of said vapors in the kettle 2 and gooseneck 3, which probably takes place in the apparatus heretofore employed, with the consequent throwing back into the kettle of some of the higher boiling fractions that go over with the mixture of turpentine and water vapors when the chamber 5 is employed.

These said higher boiling fractions that are thus taken out of the kettle 2 by this process, once and for all, are in no sense an adulteration, but are contained in all commercial spirits of turpentine to a greater or less extent. As a matter of fact, a careful analysis of the turpentine made when the expansion chamber is used shows that it is no different from the turpentine made by the old methods.

Further, owing to the extreme complexity of crude resin gums, it is very probable indeed that a change in the boiling points as well as in the pressures at which the turpentine is expelled produces a more profound change in the volume of evolved turpentine vapors than would be the case in ordinary boiling operations. This probable lowering of the boiling points of the volatiles prevents undue heating of the rosin and allows the distillation to be carried on at a faster rate, all of which tends to increase the quality of the rosin.

Not only does the expansion chamber 5 act to increase the volume of turpentine evolved in the manner above set forth, but it acts as a kind of catch-all for any "boiling over" of the kettle that may take place.

This so called "boiling over" of the kettle has always been a serious objection in the distillation of crude pine resins with the apparatus that has been heretofore employed. That is to say, when a mixture of crude pine resins and water is heated to a point above the boiling temperature of the mixture, the tendency is to foam up violently thus causing the mass in the kettle to increase in volume so that the utmost care has to be used in the heating and distilling operation to prevent accidents; and even under the best handling a great waste of material often occurs, and a very large percentage of the distilleries destroyed by fire is caused by these "boilovers." This liability to "boiling over" and the care which has to be observed to prevent the same further acts to lower the grade of rosin made and to limit the amount of turpentine which can be recovered by the present apparatus, while the use of the chamber 5 avoids such accidents and thereby, for another reason, aids in increasing the volume of turpentine recovered.

That is to say, when the kettle 2 "boils over" into the chamber 5 the heavier, unvaporized material, merely collects in the bottom of the chamber 5 and is readily drawn off upon opening the cock 16 through the pipe 15 into the reservoir 17 whence it may be returned to the kettle if desired. By this means all danger of loss from fire and water is avoided.

In addition to this, it will be observed that the goose-neck 3 enters the chamber 5 near its bottom, and any considerable boiling over will result in a large portion of the material flowing through the goose-neck 3 back into the still 2.

A portion of the volatiles will of course condense in chamber 5, and this can be drawn off by means of valve 16 through pipe 15. Or if desired, suitable connection can be made with the condenser or directly with separator, as by valve 36 and pipe 37 which would correspond to valve 35 and pipe 34 in the modified form of expansion chamber, Fig. 2.

In the somewhat modified form of invention shown in Fig. 2, I have provided the baffles 30 and 31 which guide and direct the vapors from the end 4 of the goose-neck 3 upwardly through the chamber 5 into the outlet 6 while the heavier material which has boiled over is readily caught under the baffle 31, whence the same may flow directly through the connection 32 and valve 33 back into the still 2. In such case, there is a separation of the turpentine material from the other heavier material, and any valuable spirits which may be left in the condenser 5 are readily drawn off through the drain 34 and cock 35. 40 represents the usual recording thermometer employed on distilleries, 41 being the capillary or connecting tubing between the recorder case 40, and bulb 43 inside the kettle. 42 is the usual indicating angle thermometer connecting into said kettle.

What I claim is:

1. The method of increasing the yield of volatile products from crude resins which consists in subjecting said resins to a temperature sufficient to drive off said products but insufficient to impair the quality of the residue; delivering said products during the heating operation into an expansion chamber in order to increase the yield of the same; separating in said expansion chamber the vaporized turpentine material from any heavier unvaporized material that may have accidentally boiled over into said chamber, and passing said products from said chamber to a condenser, substantially as described.

2. The method of increasing the yield of volatile products from crude resins which consists in subjecting said resins to a temperature sufficient to drive off said products but insufficient to impair the quality of the residue; delivering said products during the heating operation into a cooled expansion chamber in order to increase the yield of the same; separating in said expansion chamber the vaporized turpentine material from any heavier unvaporized material that may have accidentally boiled over into said chamber, and passing said products from said chamber to a condenser, substantially as described.

3. The method of increasing the yield of volatile turpentine products from crude resins which consists in subjecting said resins to a temperature sufficient to drive off said products but insufficient to impair the quality of the rosin residue; delivering said products during the heating operation into a cooled expansion chamber in order to increase the yield of the same; separating in said expansion chamber the vaporized turpentine material from any heavier unvaporized material that may have accidentally boiled over into said chamber, returning any unvaporized material to the heating apparatus which may pass over into said expansion chamber; passing said volatile turpentine products from said chamber to a condenser; and collecting any products that may condense in said expansion chamber, substantially as described.

4. The method of distilling turpentine from crude resins which consists in heating said resins to a temperature sufficient to evolve turpentine vapors but insufficient to impair the quality of the rosin residue; continuously leading said vapors during the heating operation into a cooled expansion chamber; separating in said expansion chamber the vaporized turpentine material from any heavier unvaporized material that may have accidentally boiled over into said chamber, returning any unvaporized residue to the heating apparatus that may pass over into said chamber; and condensing said vapors, substantially as described.

5. In an apparatus for distilling crude resins the combination of a heating kettle; an expansion chamber connected to said kettle; horizontally disposed baffles in said chamber adapted to separate the turpentine material from any unvaporized materials that may boil over into said chamber; and a condenser connected to said expansion chamber, substantially as described.

6. In an apparatus for distilling crude resins the combination of a heating kettle; an expansion chamber connected to said kettle; horizontally disposed baffles in said chamber adapted to separate the turpentine material from any unvaporized material that may boil over into said chamber; means to cool said expansion chamber; and a condenser connected to said expansion chamber, substantially as described.

7. In an apparatus for distilling crude resins the combination of a heating kettle; an expansion chamber connected to said kettle; horizontally disposed baffles in said chamber adapted to separate the turpentine material from any unvaporized material that may boil over into said chamber; means for cooling said expansion chamber; means to withdraw unvaporized material from said expansion chamber; and a condenser connected to said expansion chamber, substantially as described.

8. In an apparatus for distilling crude resins the combination of a heating kettle; an expansion chamber connected to said kettle; means to withdraw unvaporized material from said expansion chamber and pass it back to said kettle; a horizontally disposed baffle in said expansion chamber to segregate said unvaporized material; and a condenser connected to said expansion chamber, substantially as described.

In testimony whereof I affix my signature in presence of two witnesses.

ROBSON DUNWODY.

Witneses:
  JOHN C. KEY,
  C. H. ROBINSON.